(12) United States Patent
Suma

(10) Patent No.: US 11,371,554 B2
(45) Date of Patent: Jun. 28, 2022

(54) BEARING DEVICE FOR VEHICLE WHEEL

(71) Applicant: NTN CORPORATION, Osaka (JP)

(72) Inventor: Hiroto Suma, Iwata (JP)

(73) Assignee: NTN CORPORATION, Osaka (JP)

( * ) Notice: Subject to any disclaimer, the term of this patent is extended or adjusted under 35 U.S.C. 154(b) by 355 days.

(21) Appl. No.: 16/311,003

(22) PCT Filed: Apr. 20, 2017

(86) PCT No.: PCT/JP2017/015903
§ 371 (c)(1),
(2) Date: Dec. 18, 2018

(87) PCT Pub. No.: WO2018/003255
PCT Pub. Date: Jan. 4, 2018

(65) Prior Publication Data
US 2020/0309190 A1 Oct. 1, 2020

(30) Foreign Application Priority Data
Jun. 28, 2016 (JP) .............................. JP2016-127954

(51) Int. Cl.
*F16C 33/80* (2006.01)
*B60B 27/00* (2006.01)
(Continued)

(52) U.S. Cl.
CPC .......... *F16C 19/18* (2013.01); *B60B 27/0005* (2013.01); *B60B 27/0073* (2013.01); *F16C 33/805* (2013.01); *F16C 41/00* (2013.01)

(58) Field of Classification Search
CPC .... F16C 19/186; F16C 33/583; F16C 33/723; F16C 33/768; F16C 33/7823;
(Continued)

(56) References Cited

U.S. PATENT DOCUMENTS 7,126,328 B2 10/2006 Sakamoto
9,056,523 B2 6/2015 Norimatsu
(Continued)

FOREIGN PATENT DOCUMENTS

CN 1829868 9/2006
CN 104246257 12/2014
(Continued)

OTHER PUBLICATIONS

International Search Report dated Jul. 25, 2017 in International (PCT) Application No. PCT/JP2017/015903.
(Continued)

*Primary Examiner* — Alan B Waits
(74) *Attorney, Agent, or Firm* — Wenderoth, Lind & Ponack, L.L.P.

(57) ABSTRACT

A bearing device for a vehicle wheel that is capable of maintaining the sealability of a protective cover by preventing a seal member of the protective cover from being damaged without performing any complex machining. The bearing device for vehicle wheel (1) is provided with: a cylindrical sensor holder (11) that is fitted outside the protective cover (9), wherein in the outer ring (2), a protective cover fitting part (13A) to which the protective cover (9) is fitted, a seal part (13B) with which the seal member (10) of the protective cover (9) is brought into contact, and a sensor holder fitting part (13C) to which the sensor holder (11) is fitted are formed, the inner diameter of the seal part (13B) is equal to that of the sensor holder fitting part (13C), and the seal part (13B) and the sensor holder fitting part (13C) are adjacent to each other.

2 Claims, 6 Drawing Sheets

(51) Int. Cl.
*F16C 19/18* (2006.01)
*F16C 41/00* (2006.01)

(58) Field of Classification Search
CPC .............. F16C 33/783; F16C 33/7869; F16C 33/7873; F16C 33/7876; F16C 33/7879; F16C 33/7886; F16C 33/7896; F16C 35/02; F16C 41/007; F16C 43/045; B60B 27/0005; B60B 27/0068; B60B 27/0073; B60B 7/0013
See application file for complete search history.

(56) References Cited

U.S. PATENT DOCUMENTS

| | | |
|---|---|---|
| 9,527,345 B2 | 12/2016 | Suzuki et al. |
| 10,081,218 B2 | 9/2018 | Wakatsuki |
| 2006/0145686 A1 | 7/2006 | Sakamoto |
| 2013/0249273 A1 | 9/2013 | Norimatsu |
| 2015/0069826 A1 | 3/2015 | Suzuki et al. |
| 2016/0009128 A1 | 1/2016 | Wakatsuki |
| 2016/0059627 A1* | 3/2016 | Komai ............... F16C 33/7816 384/446 |
| 2017/0057136 A1* | 3/2017 | Fukuda ............ B29C 45/14311 |

FOREIGN PATENT DOCUMENTS

| | | |
|---|---|---|
| CN | 105121878 | 12/2015 |
| JP | 2012-106547 | 6/2012 |
| JP | 2013-204652 | 10/2013 |
| JP | 2014-009731 | 1/2014 |
| JP | 2015-068454 | 4/2015 |

OTHER PUBLICATIONS

Chinese Office Action dated Nov. 5, 2019 in Chinese Patent Application No. 201710508326.9 with English translation.

\* cited by examiner

BEARING DEVICE FOR VEHICLE WHEEL

TECHNICAL FIELD

The present invention relates to a bearing device for vehicle wheel. The present invention particularly relates to a bearing device for vehicle wheel, including an outer member having improved sealing property.

BACKGROUND ART

A conventionally known bearing device for vehicle wheel rotatably supports a vehicle wheel in a suspension device of an automobile or the like, and includes a rotational speed detection device configured to detect the rotational speed of the vehicle wheel. In the bearing device for vehicle wheel, a hub wheel connected with the vehicle wheel is rotatably supported through rolling elements. The rotational speed detection device of the bearing device for vehicle wheel includes an encoder ring on which different magnetic poles are alternately magnetized in the circumferential direction, and a magnetic sensor. In the bearing device for vehicle wheel, the encoder ring is fixed to the hub wheel, and the magnetic sensor is disposed at a part that does not rotate with the hub wheel. In the bearing device for vehicle wheel, the rotational speed of the vehicle wheel connected with the hub wheel can be detected based on the interval of magnetism change when the encoder ring rotating with the hub wheel passes through the vicinity of the magnetic sensor.

In some bearing devices for vehicle wheel, the encoder ring is protected by a cover to prevent false detection caused by damage on the encoder ring of the rotational speed detection device due to a flying rock and the like, and adhesion of mud, magnetic bodies, and the like thereon. For example, the encoder ring is sealed inside an outer ring of the bearing device for vehicle wheel by covering an opening of the outer ring with a non-magnetic cover. Such a configuration is disclosed in, for example, Patent Literature 1.

A bearing device for a vehicle wheel disclosed in Patent Literature 1 includes a protection cover formed in a cylindrical shape and covering a pulser ring (encoder ring), a rotational speed sensor (magnetic sensor), and a sensor cap formed in a cylindrical shape and supporting the rotational speed sensor. The protection cover including a seal member is engaged with an opening of an outer member on the pulser ring side, and the sensor cap is engaged outside of the protection cover. Accordingly, in the bearing device for a vehicle wheel, the protection cover and the sensor cap having high sealing properties not only protect a magnetic pulser ring of a rotational speed detection device from mud, magnetic bodies, and the like, but also reduce damage due to a flying rock and the like. In the bearing device for a vehicle wheel, a part engaged with the protection cover, a part in contact with the seal member of the protection cover, and a part engaged with the sensor cap are formed on an inner periphery of the opening of the outer member on the pulser ring side, and have larger inner diameters in the stated order. Accordingly, a plurality of steps are formed on the inner periphery of the opening of the outer member on the pulser ring side. With this configuration, the bearing device for a vehicle wheel needs to have a complicated fabrication on the inner periphery of the opening of the outer member to avoid damage on the seal member due to contact with the step when the protection cover is attached to the outer member.

CITATIONS LIST

Patent Literature

Patent Literature 1: JP-A 2015-68454 Gazette

SUMMARY OF INVENTION

Technical Problems

The present invention is intended to solve the above-described problem and provide a bearing device for a vehicle wheel capable of maintaining the sealing property of a protection cover by preventing damage on a seal member of the protection cover without a complicated fabrication at an inner side opening of an outer member.

Solutions to Problems

A bearing device for vehicle wheel according to the present invention includes: an outer member having an inner periphery on which outside rolling surfaces in a plurality of lines are integrally formed; an inner member including a hub wheel and at least one inner ring and having an outer periphery on which inside rolling surfaces in a plurality of lines are formed facing to the outside rolling surfaces in the plurality of lines, the hub wheel integrally including a vehicle wheel attachment flange to which a vehicle wheel is attached at one end part and including a small-diameter stepped part extending in an axial direction and formed on an outer periphery at the other end part, the at least one inner ring being fitted by pressing to the small-diameter stepped part; rolling elements arranged in a plurality of lines and housed in a freely rollable manner between each inside rolling surface and the corresponding outside rolling surface; a protection cover formed in a cylindrical shape and engaged with an inner periphery of an inner side opening of the outer member and having an outer peripheral surface on which a circular ring seal member is provided; and a sensor holder formed in a cylindrical shape and engaged outside of the protection cover on the inner periphery of the inner side opening of the outer member. A sensor holder engagement part engaged with the sensor holder, a seal part in contact with the seal member of the protection cover, and a protection cover engagement part engaged with the protection cover are formed on the inner periphery of the inner side opening of the outer member sequentially from an inner side end to an outer side in the axial direction. An inner diameter of the seal part is larger than an inner diameter of the protection cover engagement part and equal to an inner diameter of the sensor holder engagement part. The seal part is adjacent to the sensor holder engagement part.

In the bearing device for vehicle wheel according to the present invention, it is preferable that: the outer peripheral surface of the protection cover includes a large-diameter part, a tapered part connected with the large-diameter part, and a small-diameter part connected with the tapered part; the seal member is provided between the tapered part and the small-diameter part; an outer diameter of the seal member is larger than the inner diameter of the seal part; and the large-diameter part is engaged with the protection cover engagement part.

In the bearing device for vehicle wheel according to the present invention, it is preferable that the seal member includes an annular protrusion part protruding outward in a radial direction.

In the bearing device for vehicle wheel according to the present invention, it is preferable that the annular protrusion part is formed in a lip shape.

In the bearing device for vehicle wheel according to the present invention, it is preferable that: a flange part is formed at an intermediate part on an outer peripheral surface of the sensor holder; the outer peripheral surface is engaged with the sensor holder engagement part; and the sensor holder is engaged at a position determined when the flange part contacts with an end face of the outer member.

Advantageous Effects of Invention

In a bearing device for a vehicle wheel according to the present invention, no step exists in a range through which a seal member of a protection cover passes on an inner peripheral surface of an inner side opening of an outer member. Accordingly, the sealing property of the protection cover can be maintained by preventing damage on the seal member without a complicated fabrication at the inner side opening of the outer member. Moreover, the diameter of a sensor holder engagement part of the inner side opening is reduced toward inside in the radial direction to avoid a step so that the inner side opening has a small outer diameter. With this configuration, the outer member has a light weight.

In the bearing device for a vehicle wheel according to the present invention, a large-diameter part and a small-diameter part of the protection cover are coupled with each other through a tapered part to reduce an increase of the stiffness of the large-diameter part on a small-diameter side, and thus the shape of the large-diameter part is likely to fit an inside engagement surface of the outer member. Accordingly, the sealing property of the protection cover can be maintained by preventing damage on the seal member without a complicated fabrication at the inner side opening of the outer member.

In the bearing device for a vehicle wheel according to the present invention, reduced frictional resistance is generated when the seal member of the protection cover slides on a seal part and the sensor holder engagement part of the inner side opening of the outer member. Accordingly, the sealing property of the protection cover can be maintained by preventing damage on the seal member without a complicated fabrication at the inner side opening of the outer member.

In the bearing device for a vehicle wheel according to the present invention, no step needs to be provided on an inner periphery of the outer member to determine an engagement position of a sensor holder. Accordingly, the sealing property of the protection cover can be maintained by preventing damage on the seal member without a complicated fabrication at the inner side opening of the outer member.

DESCRIPTION OF EMBODIMENT

Figure 1:
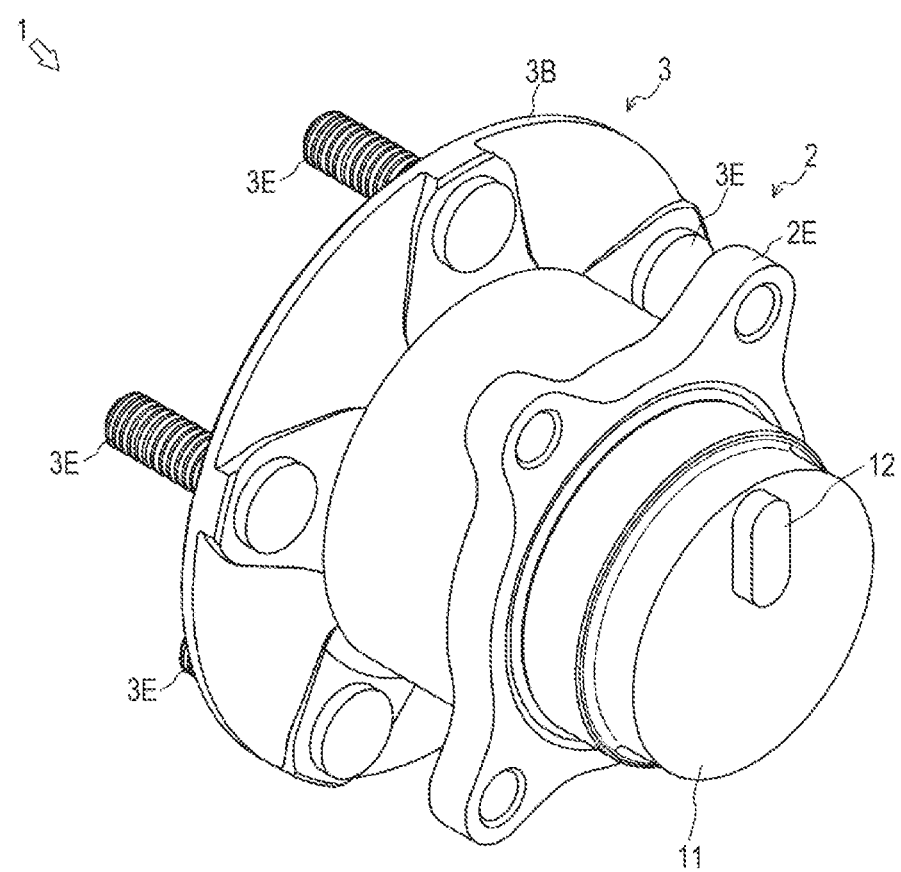
FIG. 1 is a perspective view illustrating the entire configuration of a bearing device for vehicle wheel according to an embodiment of the present invention.

The following describes a bearing device 1 for vehicle wheel as an embodiment of a bearing device for vehicle wheel according to the present invention with reference to FIGS. 1 to 3.

As illustrated in FIG. 1, the bearing device 1 for vehicle wheel rotatably supports a vehicle wheel in a suspension device of a vehicle such as an automobile. The bearing device 1 for vehicle wheel includes an outer ring 2 as an outer member, a hub wheel 3 included in an inner member, an inner ring 4 (refer to FIGS. 2A and 2B) included in the inner member, two rolling lines of a one-side ball line 5A (refer to FIGS. 2A and 2B) and an other-side ball line 5B (refer to FIGS. 2A and 2B), a seal member 6 (refer to FIGS. 2A and 2B), an encoder ring 7 (refer to FIGS. 2A and 2B), a protection cover 9 (refer to FIGS. 2A and 2B), a sensor holder 11, and a magnetic sensor 12.

Figure 2A:
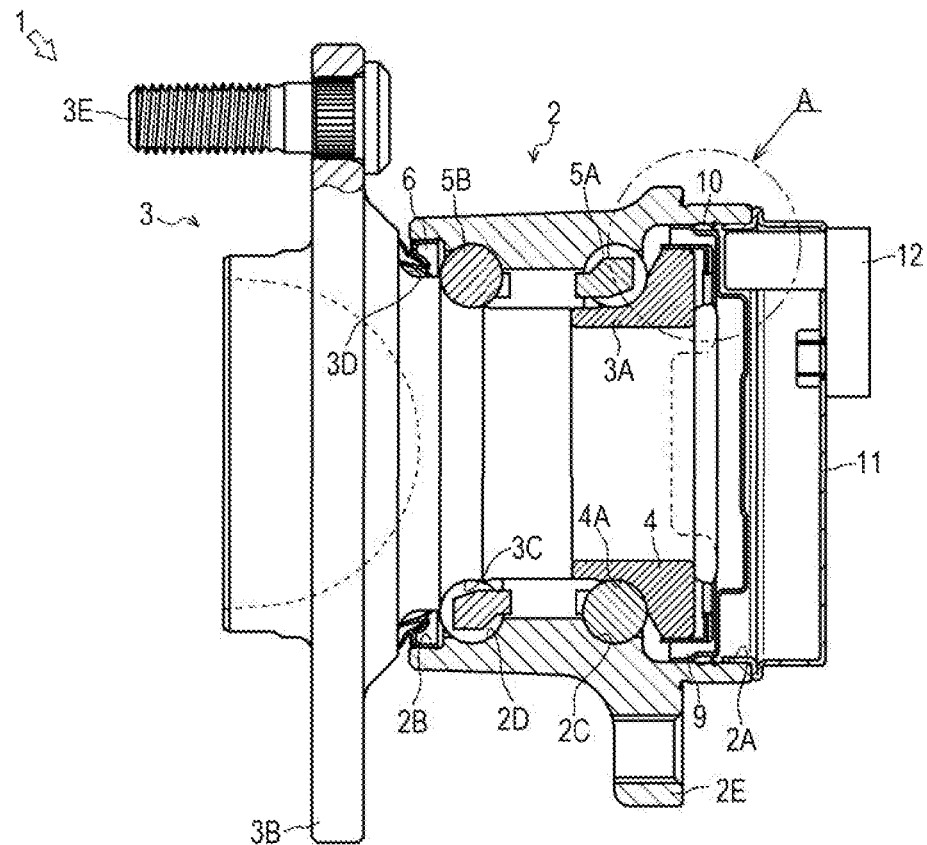
FIG. 2A is a cross-sectional view illustrating the entire configuration of the bearing device for vehicle wheel according to the embodiment of the present invention.

As illustrated in FIG. 2A, the outer ring 2 as the outer member supports the inner member (the hub wheel 3 and the inner ring 4). The outer ring 2 is made of medium- or high-carbon steel such as S53C containing carbon of 0.40 to 0.80 wt % and formed in a substantially cylindrical shape. A one-side opening 2A with which the protection cover 9 and the sensor holder 11 can be engaged is formed at a one-side (inner side) end part of the outer ring 2. An other-side opening 2B as an outer member opening with which the seal member 6 can be engaged is formed at an other-side (outer side) end part of the outer ring 2 closer to a vehicle wheel attachment flange 3B.

A one-side outside rolling surface 2C and an other-side outside rolling surface 2D having annular shapes are formed in parallel to each other in a circumferential direction on an inner peripheral surface of the outer ring 2. The one-side outside rolling surface 2C and the other-side outside rolling surface 2D have pitch circle diameters equal to each other. Alternatively, the one-side outside rolling surface 2C and the other-side outside rolling surface 2D may have pitch circle diameters different from each other. A hardened layer having a surface hardness of 58 to 64 HRC is formed on each of the one-side outside rolling surface 2C and the other-side outside rolling surface 2D by high-frequency annealing. A vehicle body attachment flange 2E for attachment to a knuckle of a suspension device (not illustrated) is integrally formed near the one-side opening 2A on an outer peripheral surface of the outer ring 2. The vehicle body attachment flange 2E is formed in a range including part of the outer ring 2 facing to the one-side outside rolling surface 2C. The one-side opening 2A (inner ring 4 side opening) of the outer ring 2 is formed such that the one-side opening 2A can be engaged possible with the protection cover 9 and the sensor holder 11.

The hub wheel 3 included in the inner member rotatably supports a vehicle wheel of a vehicle (not illustrated). The hub wheel 3 is made of medium- or high-carbon steel such as S53C containing carbon of 0.40 to 0.80 wt % and formed in a bottomed cylindrical shape. A small-diameter stepped part 3A having a diameter reduced to that of the outer peripheral surface is formed at a one-side end part (inner side) of the hub wheel 3. The vehicle wheel attachment flange 3B to which the vehicle wheel is attached is integrally formed at other-side end part (outer side) of the hub wheel 3. An inside rolling surface 3C and a seal slide surface 3D having annular shapes in the circumferential direction are formed on an outer peripheral surface of the hub wheel 3 on the other side (vehicle wheel attachment flange 3B side). The vehicle wheel attachment flange 3B is provided with hub bolts 3E at circumferentially equally spaced positions.

The inner ring 4 included in the inner member is fitted by pressing to the small-diameter stepped part 3A at the one-side end part of the hub wheel 3. The inner ring 4 is made of high-carbon chromium bearing steel such as SUJ2 and hardened by sub-quenching to a core part in the range of 58 to 64 HRC. An inside rolling surface 4A having an annular shape in the circumferential direction is formed on an outer peripheral surface of the inner ring 4. The inner ring 4 is integrally fixed to the one-side end part of the hub wheel 3 under application of a predetermined preload through fit by pressing. Accordingly, the inner ring 4 provides the inside rolling surface 4A on the one side of the hub wheel 3. Part of the hub wheel 3 extending from the small-diameter stepped part 3A on the one side to the seal slide surface 3D is hardened by high-frequency annealing to have a surface hardness in the range of 58 to 64 HRC. Accordingly, the hub wheel 3 has sufficient mechanical strength against a rotational bending load applied to the vehicle wheel attachment flange 3B, which leads to improved durability of the hub wheel 3.

The hub wheel 3 is disposed so that the inside rolling surface 4A formed in the inner ring 4 at the one-side end part faces to the one-side outside rolling surface 2C of the outer ring 2, and the inside rolling surface 3C formed on the other side faces to the other-side outside rolling surface 2D of the outer ring 2. In other words, in the inner member made of the hub wheel 3 and the inner ring 4, the inner ring 4 is disposed in the one-side opening of the outer ring 2, and the vehicle wheel attachment flange 3B of the hub wheel 3 is disposed in the other-side opening of the outer ring 2.

The one-side ball line 5A and the other-side ball line 5B as the rolling lines rotatably support the hub wheel 3. In each of the one-side ball line 5A and the other-side ball line 5B, a plurality of balls as rolling elements are held in an annular shape by a holder. The one-side ball line 5A and the other-side ball line 5B are each made of high-carbon chromium bearing steel such as SUJ2 and hardened by sub-quenching to a core part in the range of 58 to 64 HRC. The one-side ball line 5A is sandwiched in a freely rollable manner between the inside rolling surface 4A formed in the inner ring 4 and the one-side outside rolling surface 2C of the outer ring 2 facing to the inside rolling surface 4A. The other-side ball line 5B is sandwiched in a freely rollable manner between the inside rolling surface 3C formed in the hub wheel 3 and the other-side outside rolling surface 2D of the outer ring 2 facing to the inside rolling surface 3C. Accordingly, the one-side ball line 5A and the other-side ball line 5B rotatably support the hub wheel 3 and the inner ring 4 relative to the outer ring 2.

In the bearing device 1 for vehicle wheel, a multi-line angular ball bearing is constituted by the outer ring 2, the hub wheel 3, the inner ring 4, the one-side ball line 5A, and the other-side ball line 5B. In the present embodiment, the multi-line angular ball bearing is constituted in the bearing device 1 for vehicle wheel, but the present invention is not limited thereto. For example, a multi-line tapered roller bearing may be constituted.

The seal member 6 blocks a gap between the outer ring 2 and the hub wheel 3. The seal member 6 includes a plurality of seal lips made of synthetic rubber such as acrylonitrile-butadiene rubber (NBR), hydrogenated acrylonitrile-butadiene rubber (HNBR) having excellent thermal resistance, ethylene propylene rubber (EPDM), polyacrylic rubber (ACM) having excellent thermal and chemical resistance, fluoro-rubber (FKM), or silicon rubber, and integrally joined with a core metal formed in a substantially cylindrical shape by vulcanization bonding. The core metal of the seal member 6 is engaged with the other-side opening 2B of the outer ring 2, and the plurality of other-side seal lips thereof contact with the outer peripheral surface of the hub wheel 3. The seal lips contact with the outer peripheral surface of the hub wheel 3 through an oil film so that the seal member 6 can slide relative to the hub wheel 3. Accordingly, the seal member 6 prevents leakage of lubrication grease from the other-side opening 2B of the outer ring 2, and entry of rainwater, powder dust, and the like from the outside.

Figure 2B:
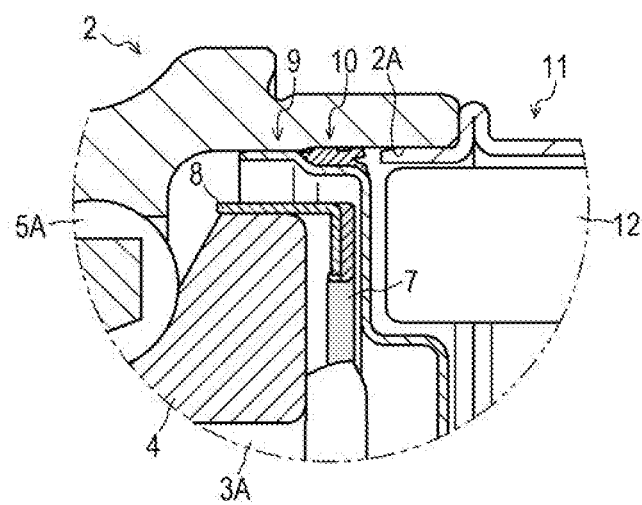
FIG. 2B is an enlarged cross-sectional view of part A in FIG. 2A.

As illustrated in FIG. 2B, the encoder ring 7 (gray part) is made of synthetic rubber mixed with magnetism powder such as ferrite, formed in an annular shape, and magnetized as magnetic poles N and S at equal pitches in the circumferential direction. The encoder ring 7 is supported by the inner ring 4 through a support ring 8. The support ring 8 is a cylindrical member including a part bent inward in the radial direction at a one-side end part. To improve the rust prevention property and the stability of detection accuracy, the support ring 8 is formed by pressing from a ferromagnetic steel plate such as a ferritic stainless steel sheet (such as JIS standard SUS430 series) or a cold rolled steel sheet (such as JIS standard SPCC type) provided with rust prevention. The encoder ring 7 is integrally joined with the bent part of the support ring 8 by vulcanization bonding. The inner ring 4 is fitted by pressing to a cylindrical part of the support ring 8 at the other-side end part. In other words, the encoder ring 7 is disposed, inside the one-side opening 2A of the outer ring 2, at a position facing to an end face of the inner ring 4. Accordingly, the encoder ring 7 is integrally rotatable with the inner ring 4 through the support ring 8.

The protection cover 9 protects the encoder ring 7 by blocking the one-side opening 2A as an inner side opening of the outer ring 2. The protection cover 9 is made of a non-magnetic austenitic stainless steel sheet (such as JIS standard SUS304 series) and formed in a bottomed cylindrical shape by pressing. The protection cover 9 is integrally provided with a seal member 10 at a side part.

Figure 3A:
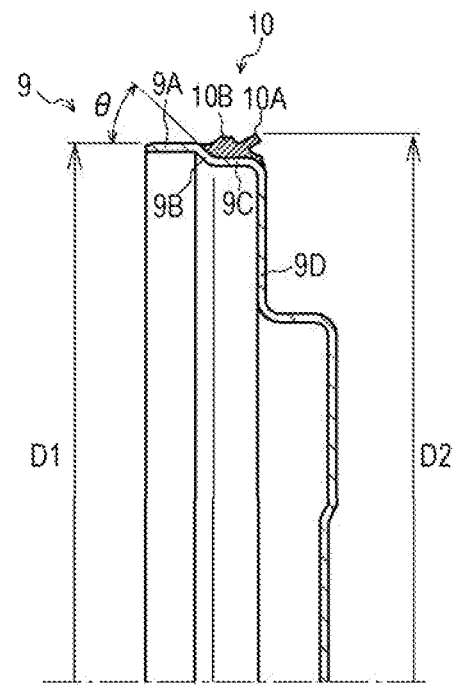
FIG. 3A is an enlarged partial cross-sectional view of a protection cover in the bearing device for vehicle wheel according to the embodiment of the present invention.

As illustrated in FIG. 3A, the protection cover 9 includes a side part at which a large-diameter part 9A formed in a cylindrical shape and a small-diameter part 9C formed in a cylindrical shape are coupled with each other through a tapered part 9B having a predetermined angle [theta], and a bottom part 9D formed in a disk shape and including a protruding central part. In the protection cover 9, the one end of the large-diameter part 9A and the other end of the small-diameter part 9C are connected with each other through the tapered part 9B, and the bottom part 9D has an outer edge integrally coupled with the other end of the small-diameter part 9C. Accordingly, the protection cover 9 includes the bottom part 9D at the one-side end, and an opening at the other-side end. The tapered part 9B and the small-diameter part 9C of the protection cover 9 are integrally provided, by vulcanization bonding, with the seal member 10 formed in a an annular shape and made of synthetic rubber such as acrylonitrile-butadiene rubber (NBR), hydrogenated acrylonitrile-butadiene rubber (HNBR) having excellent thermal resistance, ethylene propylene rubber (EPDM), polyacrylic rubber (ACM) having excellent thermal and chemical resistance, fluoro-rubber (FKM), or silicon rubber. The seal member 10 includes an annular seal lip 10A and a protrusion surface 10B integrally formed as an annular protrusion part.

In the protection cover 9, a seal outer diameter D2 as the outer diameters of the annular seal lip 10A and the protrusion surface 10B is larger than a cover outer diameter D1 as the outer diameter of the large-diameter part 9A. The protection cover 9 is engaged with an inner periphery of the one-side opening 2A of the outer ring 2. In this state, the protection cover 9 is engaged at a position entirely inside of the outer ring 2 so that the bottom part 9D is positioned close to the encoder ring 7. The bottom part 9D of the protection cover 9 is disposed facing to the encoder ring 7 with a predetermined gap interposed therebetween in the axial direction. The seal member 10 of the protection cover 9 seals a gap between the one-side opening 2A of the outer ring 2 and the protection cover 9. Accordingly, the protection cover 9 blocks the one-side opening 2A of the outer ring 2, and protects the encoder ring 7 disposed near the one-side opening 2A.

Although the seal lip 10A and the annular protrusion surface 10B are formed as the annular protrusion part in the seal member 10 of the protection cover 9, the present invention is not limited thereto, but only the seal lip 10A may be formed, or only the annular protrusion surface 10B may be formed.

As illustrated in FIG. 2A, the sensor holder 11 holds the magnetic sensor 12. The sensor holder 11 is made of a ferritic stainless steel plate (such as JIS standard SUS430 series), an austenitic stainless steel plate (such as JIS standard SUS304 series), or a cold rolled steel plate (such as JIS standard SPCC series) provided with rust prevention, and formed in a bottomed cylindrical shape by pressing. When the sensor holder 11 is made of a SPCC series material, a rust prevention film is formed by cation electrodeposition coating. In particular, it is preferable to perform cation electrodeposition coating using epoxy resin with which a strong coating film having excellent rust prevention power and sticking power can be formed. In the cation electrodeposition coating, energization is performed with a product side as a negative electrode relative to a positive electrode. Alternatively, anion electrodeposition coating may be employed in which energization is performed with a product side as a positive electrode relative to a negative electrode. The anion electrodeposition coating has the stability of a coating color and allows setting of low annealing temperature.

Figure 3B:
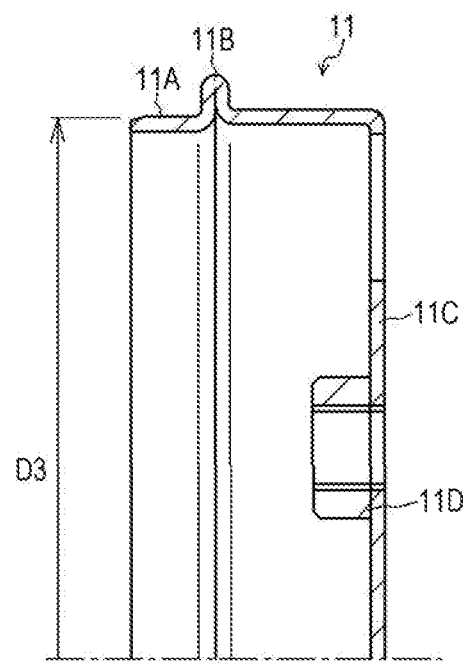
FIG. 3B is an enlarged partial cross-sectional view of a sensor holder in the bearing device.

As illustrated in FIG. 3B, the sensor holder 11 includes a side part 11A formed in a cylindrical shape and a bottom part 11C formed in a partially protruding disk shape. The side part 11A includes a flange part 11B formed in a an annular shape and protruding outward in the radial direction. The bottom part 11C includes a magnetic sensor attachment part 11d. In the sensor holder 11, a sensor holder outer diameter D3 as the outer diameter of the side part 11A is larger than the cover outer diameter D1 of the protection cover 9 and smaller than the seal outer diameter D2 of the protection cover 9.

The sensor holder 11 is engaged with the inner periphery of the one-side opening 2A of the outer ring 2. In this state, the sensor holder 11 is engaged while the flange part 11B is in contact with one-side end of the outer ring 2. In other words, the sensor holder 11 is engaged with the one-side opening 2A to cover the protection cover 9 outside (inner side) of the protection cover 9 engaged with the inner periphery of the one-side opening 2A of the outer ring 2. Accordingly, the sensor holder 11 blocks the one-side opening 2A of the outer ring 2, and the position thereof is determined relative to the outer ring 2 in the axial direction. Thus, the sensor holder 11 can hold, at an appropriate position relative to the encoder ring 7, the magnetic sensor 12 attached to the magnetic sensor attachment part 11d at the bottom part 9D.

As illustrated in FIG. 2A, the magnetic sensor 12 detects the magnetic poles of the encoder ring 7. The magnetic sensor 12 is provided to the outer ring 2 by the sensor holder 11 so that a detection plane thereof faces to the encoder ring 7. The magnetic sensor 12 is held by the sensor holder 11 with a predetermined air gap (axial direction gap) to the encoder ring 7. The magnetic sensor 12 detects passing times of the magnetic poles of the encoder ring 7 alternately passing through the detection plane while rotating integrally with the hub wheel 3.

In the bearing device 1 for vehicle wheel thus configured, the multi-line angular ball bearing is constituted by the outer ring 2, the hub wheel 3, the inner ring 4, the one-side ball line 5A, and the other-side ball line 5B, and the hub wheel 3 is rotatably supported by the outer ring 2 through the one-side ball line 5A and the other-side ball line 5B. In the bearing device 1 for vehicle wheel, a gap between the one-side opening 2A of the outer ring 2 and the inner ring 4 is blocked by the protection cover 9 and the sensor holder 11, and a gap between the other-side opening 2B of the outer ring 2 and the hub wheel 3 is blocked by the seal member 6. Accordingly, in the bearing device 1 for vehicle wheel, the protection cover 9 prevents leakage of lubrication grease from the inside and entry of rainwater, powder dust, and the like from the outside, and protects the encoder ring 7 fixed to the inner ring 4. In the bearing device 1 for vehicle wheel, the sensor holder 11 holds the magnetic sensor 12 at an appropriate position relative to the encoder ring 7.

Figure 4:
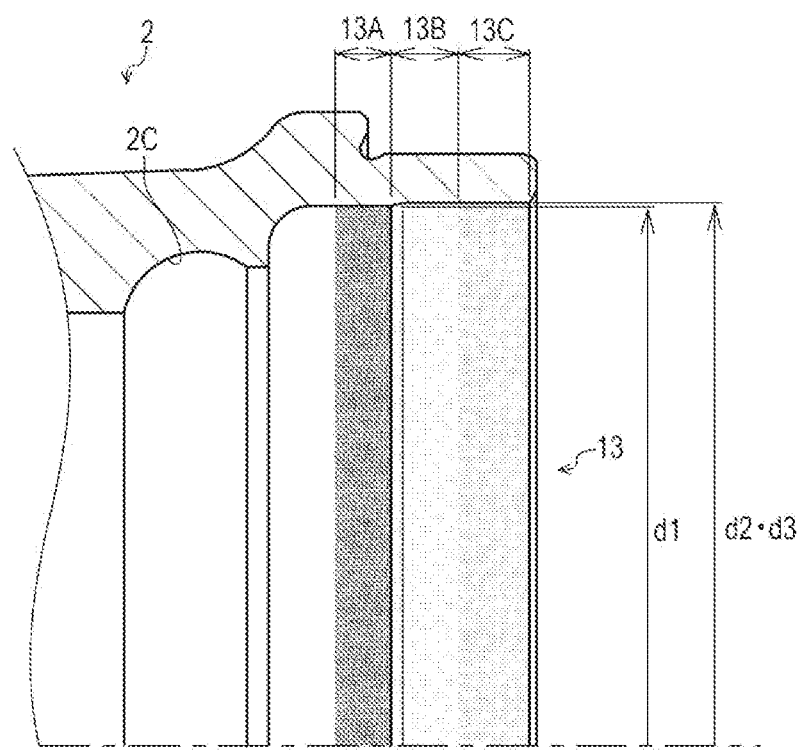
FIG. 4 is an enlarged partial cross-sectional view illustrating the shape of an engagement hole of an outer ring in the bearing device for vehicle wheel according to the embodiment of the present invention.

The following describes the shape of the inner periphery of the one-side opening 2A of the outer ring 2 in detail with reference to FIG. 4.

As illustrated in FIG. 4, the inner periphery of the one-side opening 2A of the outer ring 2 is formed as an engagement hole 13 in which the protection cover 9 and the sensor holder 11 are engaged with each other. The engagement hole 13 includes a protection cover engagement part 13A (densest gray part) engaged with the large-diameter part 9A of the protection cover 9 (refer to FIG. 3A) through fit by pressing, a seal part 13B (third densest gray part) in contact with the seal member 10 of the protection cover 9, and a sensor holder engagement part 13C (second densest gray part) engaged with the side part 11A of the sensor holder 11 (refer to FIG. 3B) through fit by pressing.

The sensor holder engagement part 13C extends toward the outer side in the axial direction from an inner-side end of the one-side opening 2A (the one-side end of the outer ring 2). The sensor holder engagement part 13C is formed as a hole that has a length in the axial direction and with which a part up to the flange part 11B in the side part 11A of the sensor holder 11 can be entirely engaged. The seal part 13B is formed adjacent to an outer side of the sensor holder engagement part 13C in the axial direction. The seal part 13B is formed as a hole that has a length in the axial direction and includes the small-diameter part 9C of the protection cover 9 (refer to FIG. 3A). The protection cover engagement part 13A is formed adjacent to an outer side of the seal part 13B in the axial direction. The protection cover engagement part 13A is formed, at a position overlapping with the outer ring 2 when viewed in the radial direction, as a hole that has a length in the axial direction and with which the large-diameter part 9A of the protection cover 9 can be engaged. Accordingly, the sensor holder engagement part 13C, the seal part 13B, and the protection cover engagement part 13A are formed on the inner periphery of the one-side opening 2A of the outer ring 2 sequentially from an end face of the one-side opening 2A toward the outer side in the axial direction.

In the engagement hole 13, an outside inner diameter d3 as the inner diameter of the sensor holder engagement part 13C is larger than an inside inner diameter d1 as the inner diameter of the protection cover engagement part 13A. In the engagement hole 13, a seal part inner diameter d2 as the inner diameter of the seal part 13B formed between the protection cover engagement part 13A and the sensor holder engagement part 13C is equal to the outside inner diameter d3. Accordingly, the engagement hole 13 only includes a small-diameter part at which the protection cover engagement part 13A is formed, and a large-diameter part at which the seal part 13B and the sensor holder engagement part 13C are formed.

The protection cover engagement part 13A of the engagement hole 13 has such an inside inner diameter d1 that allows engagement of the large-diameter part 9A of the protection cover 9 (refer to FIG. 3A) through fit by pressing. The sensor holder engagement part 13C of the engagement hole 13 has such an outside inner diameter d3 that allows engagement of the side part 11A of the sensor holder 11 (refer to FIG. 3B) through fit by pressing. The sensor holder engagement part 13C has such an outside inner diameter d3 that allows the large-diameter part 9A of the protection cover 9 to pass through without contact with an inner peripheral surface of the sensor holder engagement part 13C and allows the seal lip 10A (refer to FIG. 3A) and the protrusion surface 10B (refer to FIG. 3A) of the seal member 10 of the protection cover 9 to move in contact with the inner peripheral surface of the sensor holder engagement part 13C while maintaining the sealing property. The seal part 13B of the engagement hole 13 has such a seal part inner diameter d2 that allows the large-diameter part 9A of the protection cover 9 to pass through without contact with an inner peripheral surface of the seal part 13B and allows the seal lip 10A and the protrusion surface 10B of the seal member 10 of the protection cover 9 to move in contact with the inner peripheral surface of the seal part 13B while maintaining the sealing property.

The following describes assembly of the protection cover 9 and the sensor holder 11 into the engagement hole 13 of the outer ring 2 with reference to FIGS. 5A, 5B, 6A, and 6B.

Figure 5A:
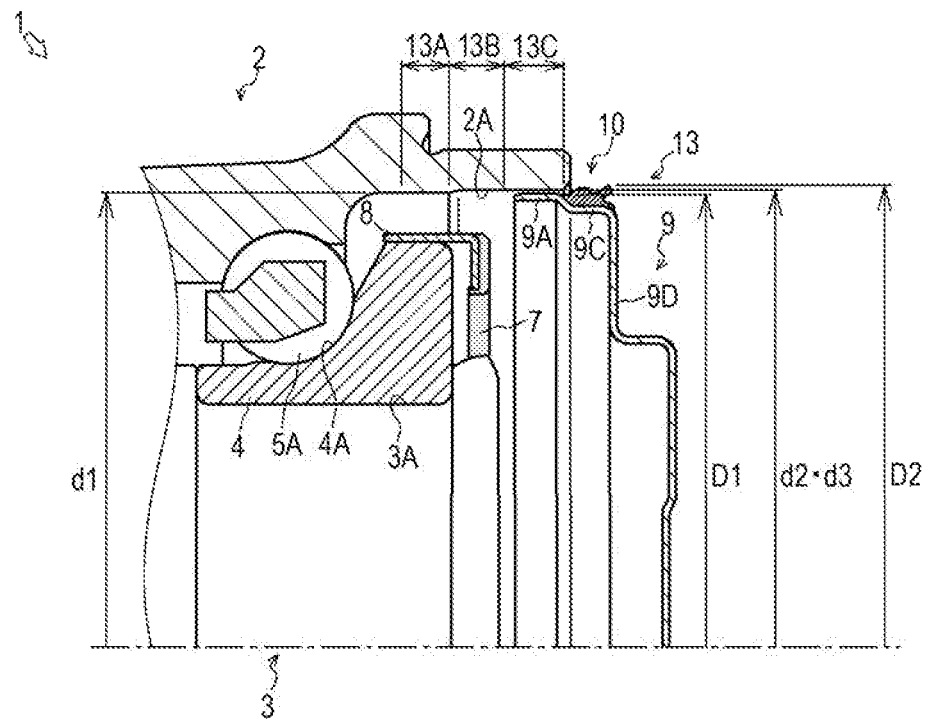
FIG. 5A is an enlarged partial cross-sectional view illustrating a state in which a large-diameter part of the protection cover is inserted in the engagement hole of the outer ring in the bearing device for vehicle wheel according to the embodiment of the present invention.

As illustrated in FIG. 5A, the protection cover 9 is inserted into the engagement hole 13 while the axial center of the protection cover 9 coincides with the axial center of the engagement hole 13 of the outer ring 2, as the entrance of the engagement hole 13. The large-diameter part 9A of the protection cover 9 is inserted into the sensor holder engagement part 13C of the engagement hole 13. In this case, the large-diameter part 9A having the cover outer diameter D1 smaller than the outside inner diameter d3 of the sensor holder engagement part 13C does not contact with the inner peripheral surface of the sensor holder engagement part 13C.

Figure 5B:
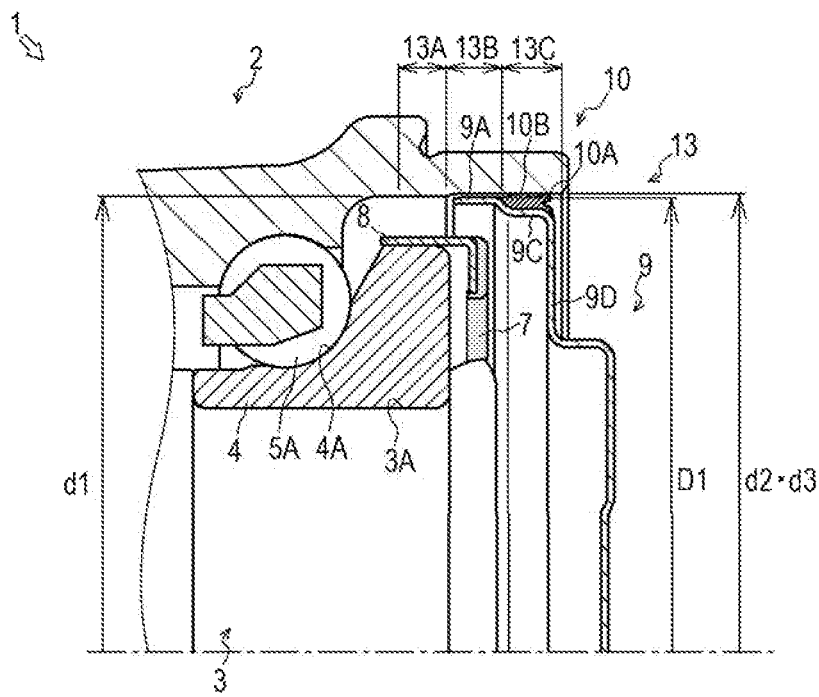
FIG. 5B is an enlarged partial cross-sectional view illustrating a state in which the protection cover is inserted in the engagement hole up to a seal part in the bearing device.

As illustrated in FIG. 5B, when the protection cover 9 is moved toward the inside (outer side) of the engagement hole 13, the large-diameter part 9A is inserted into the seal part 13B of the engagement hole 13, and the seal member 10 is inserted into the sensor holder engagement part 13C. In this case, the large-diameter part 9A having the cover outer diameter D1 smaller than the seal part inner diameter d2 of the seal part 13B does not contact with the inner peripheral surface of the seal part 13B. Simultaneously, the seal member 10 having the seal outer diameter D2 (refer to FIG. 5A) larger than the outside inner diameter d3 of the sensor holder engagement part 13C is moved toward the inside of the engagement hole 13 while the seal lip 10A and the protrusion surface 10B are deformed in contact with the inner peripheral surface of the sensor holder engagement part 13C.

Figure 6A:
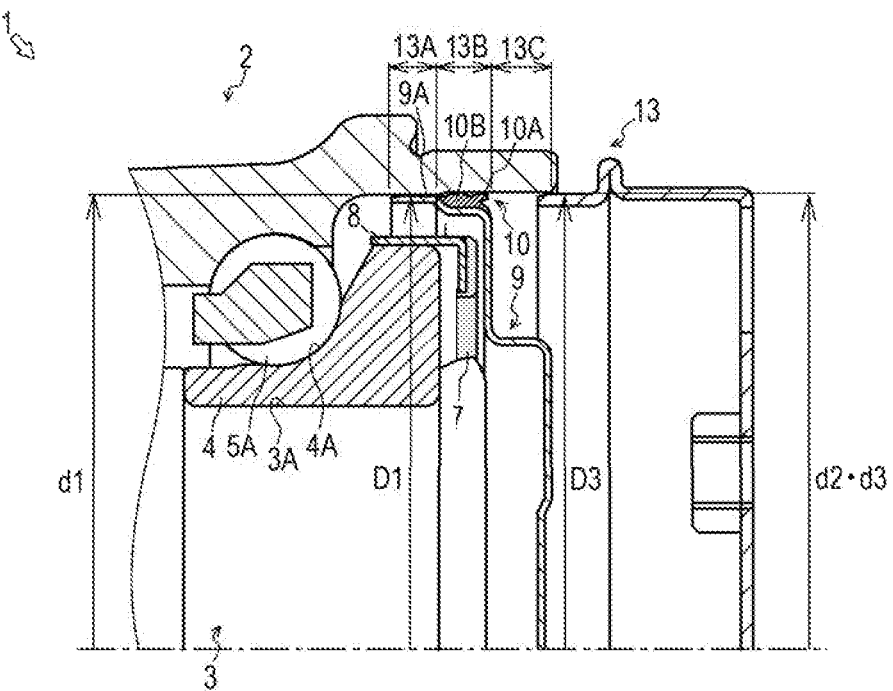
FIG. 6A is an enlarged partial cross-sectional view illustrating a state in which the large-diameter part of the protection cover is engaged with the engagement hole of the outer ring and the sensor holder is inserted in the engagement hole in the bearing device for vehicle wheel according to the embodiment of the present invention.

As illustrated in FIG. 6A, when the protection cover 9 is moved toward the inside of the engagement hole 13, the large-diameter part 9A is inserted into the protection cover engagement part 13A of the engagement hole 13, and the seal member 10 is inserted into the seal part 13B. In this case, the large-diameter part 9A having the cover outer diameter D1 substantially equal to the inside inner diameter d1 of the protection cover engagement part 13A is moved (engaged through fit by pressing) toward the inside of the engagement hole 13 while being in contact with an inner peripheral surface of the protection cover engagement part 13A. Simultaneously, the seal member 10 having the seal outer diameter D2 (refer to FIG. 5A) larger than the seal part inner diameter d2 of the seal part 13B is moved toward the inside of the engagement hole 13 while the seal lip 10A and the protrusion surface 10B are in contact with the inner peripheral surface of the sensor holder engagement part 13C. The protection cover 9 is fixed to the outer ring 2 when the large-diameter part 9A is engaged through fit by pressing up to a predetermined position on the protection cover engagement part 13A of the engagement hole 13, and the seal lip 10A and the protrusion surface 10B of the seal member 10 contact with the inner peripheral surface of the seal part 13B, thereby achieving the sealing property of the engagement hole 13 and the protection cover 9.

As illustrated in FIG. 6A, the sensor holder 11 is inserted into the engagement hole 13 through the one-side opening 2A of the outer ring 2, as the entrance of the engagement hole 13, while the axial center of the sensor holder 11 coincides with the axial center of the engagement hole 13. The side part 11A of the sensor holder 11 is inserted into the sensor holder engagement part 13C of the engagement hole 13. In this state, the side part 11A having the sensor holder outer diameter D3 substantially equal to the outside inner diameter d3 of the sensor holder engagement part 13C is engaged through fit by pressing while being in contact with the inner peripheral surface of the sensor holder engagement part 13C.

Figure 6B:
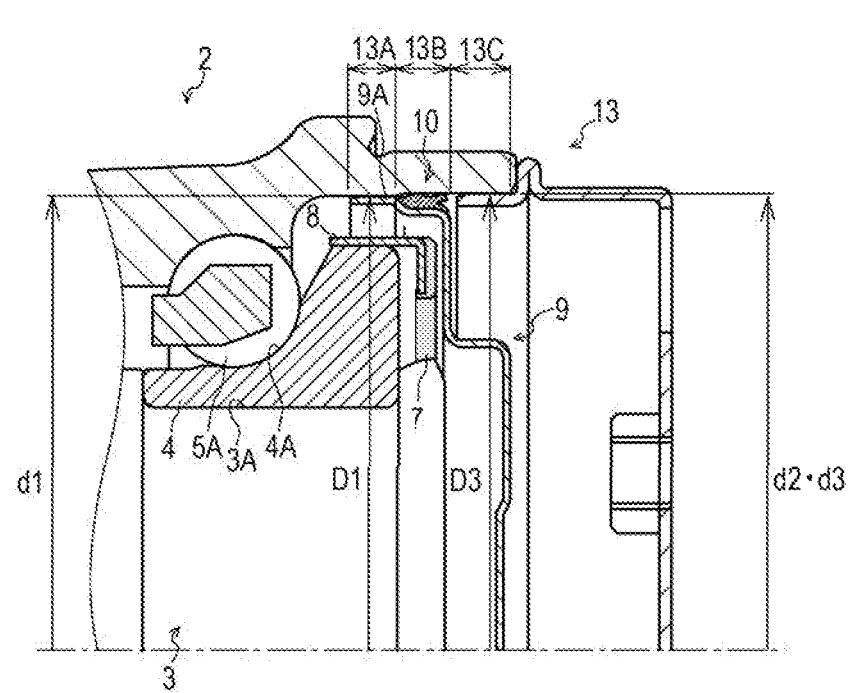
FIG. 6B is an enlarged partial cross-sectional view illustrating a state in which the protection cover and the sensor holder are engaged with the engagement hole in the bearing device.

As illustrated in FIG. 6B, the sensor holder 11 is moved toward the inside of the engagement hole 13 until the flange part 11B of the side part 11A contacts with the one-side end of the outer ring 2.

With this configuration, the seal member 10 of the protection cover 9 is moved from the sensor holder engagement part 13C to a predetermined position on the seal part 13B while being in contact with the inner peripheral surface of the sensor holder engagement part 13C and the inner peripheral surface of the seal part 13B having identical inner diameters. Accordingly, the seal member is moved on the inner peripheral surface of the engagement hole 13 from the sensor holder engagement part 13C to the predetermined position on the seal part 13B while maintaining a constant contact state without passing through a step or the like. The protection cover engagement part 13A and the sensor holder engagement part 13C, which are used to engage and fix the protection cover 9 and the sensor holder 11 through fit by pressing, and the seal part 13B, which is used to seal a gap between the engagement hole 13 and the protection cover 9, are formed only by providing the small-diameter part and the large-diameter part on the inner peripheral surface of the engagement hole 13. In this manner, in the bearing device 1 for vehicle wheel, damage on the seal member of the protection cover 9 can be prevented to maintain the sealing property of the protection cover 9 without a complicated fabrication on the engagement hole 13 at the opening of the outer ring 2 on the inner ring 4 side.

In the protection cover 9, the large-diameter part 9A and the small-diameter part 9C are connected with each other through the tapered part 9B, thereby reducing the minimum dimension of a step between the outer diameter of the small-diameter part 9C and the cover outer diameter D1 as the outer diameter of the large-diameter part 9A when produced by pressing. Thus, in the protection cover 9, the small-diameter part 9C can have an inner diameter extended outward in the radial direction as compared to a case in which the large-diameter part 9A and the small-diameter part 9C are connected with each other through a stepped part bent substantially at right angle. In addition, since the encoder ring 7 is provided at the part bent inward in the radial direction at the one-side end part of the support ring 8, no space for the encoder ring 7 needs to be provided outside of the inner ring 4 in the radial direction. Thus, in the bearing device 1 for vehicle wheel, the diameters of the hub wheel 3 and the inner ring 4 can be increased, and the pitch circle diameters of the one-side ball line 5A and the other-side ball line 5B can be increased. Accordingly, the bearing device 1 for vehicle wheel can have improved mechanical strength against a rotational bending load applied to the vehicle wheel attachment flange 3B and improved rolling fatigue lifetime.

In the above-described embodiment of the invention, the bearing device 1 for vehicle wheel has a third-generation structure in which the inside rolling surface 3C of the one-side ball line 5A is directly formed at an outer periphery of the hub wheel 3, but the present invention is not limited thereto. The bearing device 1 for vehicle wheel may have a second-generation structure in which a pair of inner rings 4 are fixed to the hub wheel 3 through fit by pressing. The embodiment does not limit the present invention at all but is merely exemplary. The present invention can be achieved in various embodiments without departing from the scope of the present invention. The scope of the present invention is indicated by the description of the claims, and includes the equivalent meaning as described in the claims, and all changes within the scope.

INDUSTRIAL APPLICABILITY

The present invention is applicable to a bearing device for vehicle wheel.

REFERENCE SIGNS LIST 1 bearing device for vehicle wheel
2 outer ring
2A one-side opening
3 hub wheel
3A small-diameter stepped part
4 inner ring
9 protection cover
10 seal member
11 sensor holder
13A protection cover engagement part
13B seal part
13C sensor holder engagement part

The invention claimed is:
1. A bearing device for a vehicle wheel, the device comprising:
   an outer member having an inner periphery on which outside rolling surfaces in a plurality of lines are integrally formed;
   an inner member including a hub wheel and at least one inner ring and having an outer periphery on which inside rolling surfaces in a plurality of lines are formed facing to the outside rolling surfaces in the plurality of lines, the hub wheel integrally including a vehicle wheel attachment flange to which a vehicle wheel is attached at one end part and including a small-diameter stepped part extending in an axial direction and formed on an outer periphery at the other end part, the at least one inner ring being fitted by pressing to the small-diameter stepped part;
   rolling elements arranged in a plurality of lines and housed in a freely rotatable manner between each inside rolling surface and a corresponding outside rolling surface;
   a protection cover formed in a cylindrical shape and engaged with an inner periphery of an inner side opening of the outer member and having an outer peripheral surface on which a seal member formed in a circular ring is provided; and
   a sensor holder formed in a cylindrical shape and engaged outside of the protection cover on the inner periphery of the inner side opening of the outer member, wherein
   a sensor holder engagement part engaged with the sensor holder, a seal part in contact with the seal member of the protection cover, and a protection cover engagement part engaged with the protection cover are formed on the inner periphery of the inner side opening of the outer member sequentially from an inner side end to an outer side in the axial direction,
   an inner diameter of the seal part is larger than an inner diameter of the protection cover engagement part and equal to an inner diameter of the sensor holder engagement part, and
   the seal part is adjacent to the sensor holder engagement part,
   wherein the outer peripheral surface of the protection cover includes a first portion, a tapered part connected with the first portion, and a second portion connected with the tapered part, the first portion having a larger diameter than the second portion, the seal member is provided between the tapered part and the second portion, an outer diameter of the seal member is larger than the inner diameter of the seal part, the first portion is engaged with the protection cover engagement part, the seal member includes an annular protrusion part protruding outward in a radial direction, the annular protrusion part has a seal lip and a protrusion surface, the seal lip is inclined and protrudes toward the inner side, and the seal lip is deformed inward in the radial direction when the seal lip and the protrusion surface move inward of the inner side opening in a state of being in contact with an inner periphery of the sensor holder engagement part.

2. The bearing device for a vehicle wheel according to claim 1, wherein a flange part is formed at an intermediate part on an outer peripheral surface of the sensor holder, the outer peripheral surface is engaged with the sensor holder engagement part, and the sensor holder is engaged at a position determined when the flange part contacts with an end face of the outer member.

* * * * *